W. KERR.
MUFFLER CUT-OUT VALVE.
APPLICATION FILED MAY 25, 1917.
1,282,857. Patented Oct. 29, 1918.
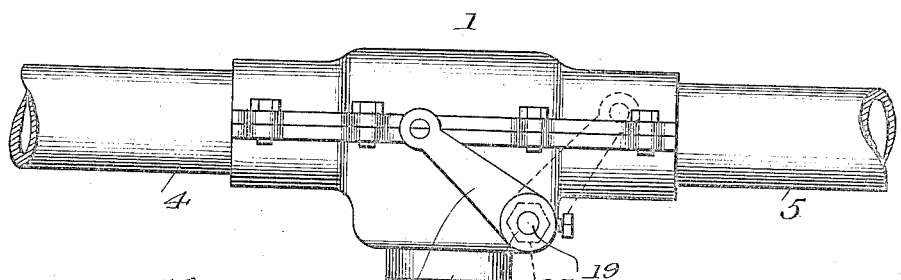
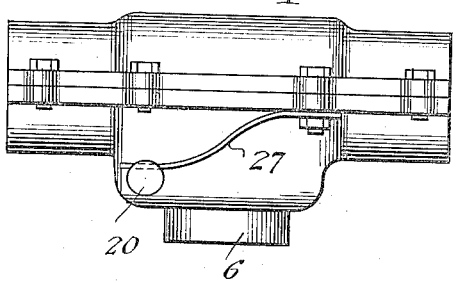
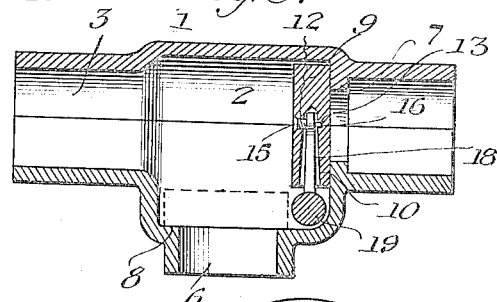
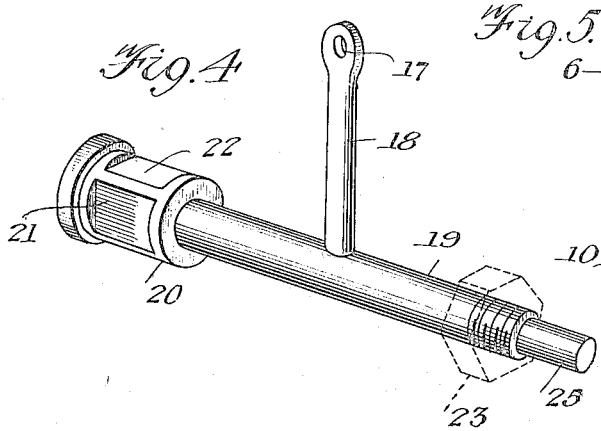
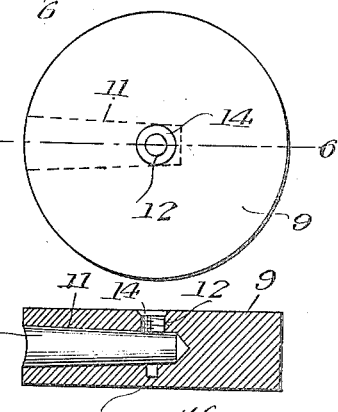
WITNESSES
INVENTOR
William Kerr
BY Victor J. Evans
ATTORNEY

UNITED STATES PATENT OFFICE.

WILLIAM KERR, OF HEBRON, ILLINOIS.

MUFFLER-CUT-OUT VALVE.

1,282,857.　　　　Specification of Letters Patent.　　Patented Oct. 29, 1918.

Application filed May 25, 1917. Serial No. 170,967.

*To all whom it may concern:*

Be it known that I, WILLIAM KERR, a citizen of the United States, residing at Hebron, in the county of McHenry and State of Illinois, have invented new and useful Improvements in Muffler-Cut-Out Valves, of which the following is a specification.

This invention relates to improvements in muffler cut-out valves for automobiles or other vehicles propelled by internal combustion engines.

An object of the invention is to provide means whereby a perfectly muffled car can be readily converted into a racing car absolutely free from back pressure in the exhaust, thereby securing maximum power, or whereby the products of combustion from the exhaust of the engine may be utilized for sounding a whistle, horn or the like, or whereby such products may be directed to a foot warming device arranged in the car.

The improvement has, however, for its primary object to arrange upon the exhaust pipe of an engine a valve casing having an angular passage and being provided with a valve seat adjacent to said passage and a second valve seat arranged adjacent to the branch of the exhaust pipe connected with the muffler, to provide a flat disk valve for said seats having means whereby the same will automatically adjust itself with relation to its seats, and means for actuating the said valve to swing the same upon either of its seats and to retain the same thus seated, and whereby the exhaust products of combustion may be directed to the muffler, or shut-off from the muffler and direct to the atmosphere or as previously stated to a horn or other device.

It is a further object of the invention to produce a device of this character which shall be of a simple construction, comparatively cheap to manufacture and which will perform the functions for which it is devised with ease and with efficiency.

With the above and other objects in view the improvement resides in the construction, combination and arrangement of parts set forth in the following specification and falling within the scope of the appended claim.

In the drawings:

Figure 1 is a side elevation of my improvement,

Fig. 2 is a similar view but looking toward the opposite side thereof,

Fig. 3 is an approximately central vertical longitudinal sectional view through the same, Fig. 4 is an enlarged perspective view of the operating member for the valve, Fig. 5 is a plan view of the valve, and Fig. 6 is a sectional view approximately on the line 6—6 of Fig. 5.

As illustrated by the drawing the valve casing is preferably of two sections having their confronting edges flanged and provided with securing elements, such as nuts and bolts, while a suitable packing may be arranged between the confronting surfaces of the sectional casing.

The valve casing 1 includes a central valve chamber 2 provided with a direct longitudinal passage 3 to one end of which is connected the section of the pipe leading from the exhaust of the engine, indicated by the character 4, and to the other end of the said passage 3 is connected the pipe 5 which leads to the muffler (not shown). Also communicating with the valve chamber 2 is a branch or outlet member 6 providing the cut-out, and to this pipe member 6 may be connected a horn or other signaling device or a pipe member leading to a foot warmer in the vehicle, or as illustrated in the drawing the said branch communicates directly with the atmosphere.

The chamber 2, at the portion thereof, provided with the branch connected with the muffler pipe 5 is formed with an inturned flange 7 that provides one of the seats for the valve, and the said chamber is also provided with a shoulder 8 arranged at the connection of the member 6 therewith, the said shoulder providing the other seat for the valve.

The valve, indicated by the numeral 9, is in the nature of a flat disk and is formed with a longitudinal centrally arranged depression 10 which enters from one of the edges of the said valve and terminates approximately at the center of the valve. The side walls provided by the depression 10 are inclined or flared outwardly from the inner wall of the said depression to the periphery of the disk, as indicated by the characters 11. The flat disk valve 9, upon one of its faces is provided with a threaded orifice 12 arranged centrally of the said valve, the said orifice communicating with the depression 10 and being also arranged in a line with a depression providing a socket 13 arranged upon the wall of the depression opposite that with which the threaded opening 12 communicates, and the said socket being disposed centrally of the said threaded depression 12. The flat valve, upon its face provided with the threaded opening 12 is reamed, as at 14, whereby to receive the head of a screw member 15 that engages with the threads of the depression 12 and which has its outer end formed with a stud 16 that is received in the socket 13. By reference to the drawings it will be noted that the member 15 is threaded only at the portion of its shank thereof received in the opening 12, and the said shank is adapted to pass through an opening 17 in an element 18, that is received in the depression 10. The arm 18 is approximately centrally connected with an operating shaft 19, the said shaft being journaled in suitable openings in the opposite walls of the casing 1 and being located in the chamber 2 at the corner thereof between the valve seats 7 and 8. One of the ends of the shaft 19 is provided with an enlargement forming a rounded head 20, the said head having oppositely beveled surfaces 21 and 22 respectively. The opposite end of the rod is threaded and is designed to receive a nut 23 which binds against the casing and retains the shaft in proper position with respect to the casing. It is, of course, to be understood that suitable washers may be arranged between the head 20, the nut 23 and the casing.

The shaft 19, outward of its threaded portion 23, is provided with a reduced extension 25 to which is connected a lever 26, the said lever being secured in any desired or preferred manner to a suitable rod or other operating device leading into the automobile and arranged at a convenient point to the operator of the said automobile, such construction, however, not forming part of the present invention, has not been illustrated.

Secured between one of the nuts and bolts providing the connecting elements for the sections of the casing is the end of a flat arched spring 27, and the free end of the said spring being designed to contact with one of the angular faces 21 or 22 of the head 20 of the shaft 19 to retain the said shaft against accidental turning and to effect the holding of the valve upon either of its seats 7 or 8.

By providing the valve with the substantially wedge-shaped depressions it will be noted that the said valve will automatically adjust itself to either of its seats 7 or 8, and by reference to the drawing it will be noted that the pipe sections 4 and 5 are so arranged within the valve casing that the portion thereof freely communicates with the valve chamber 2 of the said casing or in other words no obstruction is offered to the passages of the said pipe members.

Having thus described the invention, what I claim is:

A substantially T-shaped valve casing having angularly disposed valve seats therein, a flat disk valve for the seats provided with a centrally disposed depression extending beyond the center thereof, the side walls of the said depression being flared outwardly from the inner wall thereof to the periphery of the valve, a shaft journaled in bearing openings in the casing between the valve seats, an arm on said shaft entering the referred to depression in the valve and pivotally secured to the valve whereby the said valve is permitted a limited swinging and angular movement with respect to the arm, a head on said arm having spaced flat surfaces providing shoulders therebetween, and a flat bowed spring secured to the casing and engaging with the flat surfaces between the said shoulders.

In testimony whereof I affix my signature.

WILLIAM KERR.